Nov. 8, 1960 A. R. LA HAISE 2,959,672
SIGNAL-PLUS-NOISE TO NOISE RATIO METER
Filed Feb. 24, 1960
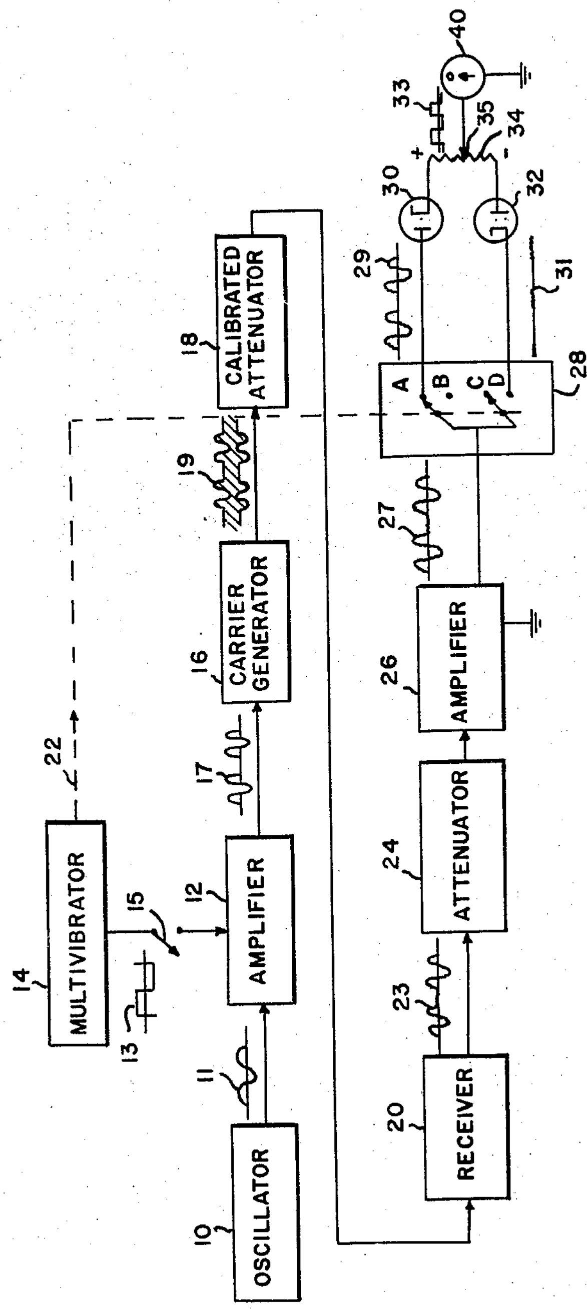
INVENTOR.
ANTHONY R. LA HAISE
BY Wade Koontz
ATTORNEY
and
George O. Saile
AGENT United States Patent Office 2,959,672

Patented Nov. 8, 1960

2,959,672

SIGNAL-PLUS-NOISE TO NOISE RATIO METER

Anthony R. La Haise, Tylersport, Pa., assignor, by mesne assignments, to the United States of America as represented by the Secretary of the Air Force Filed Feb. 24, 1960, Ser. No. 10,818

4 Claims. (Cl. 250—20)

The invention relates to a meter useful in determining radio receiver sensitivity when the sensitivity is based upon the input required to develop a signal-plus-noise to noise ratio of a given value.

Conventional methods for obtaining sensitivity measurements require repeated attenuator adjustments until the voltage level between the two signals is sufficient to obtain two meter readings separated by the desired ratio. These procedures are tedious and time consuming as well as tending to yield greater error, for example from human errors in meter reading, than would be the case using the meter which is the subject of this invention.

It is an object of the invention to provide a semi-automatic device for measurement of receiver sensitivity based upon signal-plus-noise to noise ratio.

It is the specific object of the invention to provide a device that will measure radio receiver sensitivity based upon the signal-plus-noise to noise ratio both rapidly and accurately by use of a single manual adjustment.

The novel meter capable of accomplishing these objects consists essentially of a receiver input circuit and output circuit. The receiver input circuit generates a continuous sinusoidal signal, adjusts the signal to the desired amplitude, pulses the signal on and off at predetermined time intervals and superimposes the signal upon a carrier wave. The pulse modulated wave is applied through an attenuator to the receiver under test. The receiver output circuit compares the signal-plus-noise to the noise without a signal of the receiver output across a voltage divider by means of an electronic switch and rectifier tube arrangement. A zero reading meter is adjustably connected to the voltage divider resistor. The desired signal-plus-noise to noise ratio is preset on the voltage divider resistor. The receiver input circuit's attenuator setting is adjusted for zero reading on the zero center reading meter which setting gives the receiver sensitivity for the preset signal-plus-noise to noise ratio.

Other objects, novel features and advantages of this invention will become apparent from the following specification and accompanying drawing which is a schematic diagram of an embodiment of the novel signal-plus-noise to noise ratio meter.

In the accompanying drawing the radio receiver 20 under test has applied to it an input carrier voltage with standard modulation graphically indicated at 19. An oscillator 10 generates a continuous sinusoidal signal 11. The signal 11 is applied to an amplifier 12 which adjusts the signal 11 to the desired amplitude level. A square-wave 13 produced by a multivibrator 14 is applied to the amplifier 12 by closing the switch 15. The square-wave voltage 13 switches the amplifier circuit 12 on or off electronically by energizing the grid or cathode of the amplifier control tube (not shown). The sinusoidal input signal 11 to the amplifier is thereby altered by the amplifier circuit 12 to an on or off pulsating signal 17 which has an amplitude level adjusted to produce the desired percent modulation of the carrier in the carrier generator 16. The amplifier output signal 17 is superimposed upon the carrier wave in the carrier generator 16 to produce the standard pulse modulated signal 19. The output of the carrier generator 16 is applied through the calibrated generator attenuator 18 to the input of receiver 20. The generator attenuator 18 is an adjustable resistance type attenuator and calibrated to give the sensitivity of the receiver under test.

The output 23 of the receiver is applied preferably through an attenuator 24 and amplifier 26 combination which acts as a gain control so that the metering circuit can be set to the correct level of sensitivity for the receiver 20 under test. The amplifier output is coupled to an electronic switch 28 which has a first position AC and a second position BD.

The same square-wave voltage 13 that switches the amplifier circuit 12 on or off acts to move the electronic switch from the first position AC to the second position BD. When the amplifier 12 is energized, electronic switch 28 is in the first position AC and, when the amplifier is deenergized, the electronic switch 28 is in position BD. The signal-plus-noise portion 29 of the amplifier output signal 27 is therefore passed through the electronic switch 28 while in the AC position and the noise without signal portion 31 of the output signal 27 is passed through the BD position of the electronic switch.

A voltage divider 34 is connected across the electronic switch 28. The AC first position of the switch 28 connects the amplifier 26 with the more positive end of the voltage divider 34 though a "signal-plus-noise" rectifier tube 30. The BD second position of the switch 28 connects the amplifier 26 with the more negative end of voltage divider 34 through a "noise" rectifier tube 32. The anode of rectifier tube 30 is directly connected to the contact A and the cathode of rectifier tube 32 directly connected to the contact D of the switch 28. A zero center reading meter 40 is connected to the variable contact arm 35 of voltage divider 34. The approximate wave form appearing at the output of the voltage divider 34 is graphically indicated at 33.

The sensitivity of a radio receiver or similar device is taken as the minimum input signal with standard modulation to produce a specified signal-plus-noise to noise ratio. For amplitude-modulation radio receivers the standard is thirty percent modulation at one thousand cycles per second.

The operation of the receiver input circuit to produce such a standard input signal may be begun by generating a one thousand cycles per second continuous sine wave 11 by means of oscillator 10. The amplitude of this modulating frequency wave is adjusted by the amplifier 12 to produce the desired percent modulation of the generator carrier. The multivibrator 14 is set to generate a ten cycle per second square-wave 13. The switch 15 is closed thereby causing the one thousand cycle per second modulation to be pulsed on and off at ten cycles per second as graphically depicted at 17. The signal 17 produced by the amplifier 12 is superimposed upon a high frequency carrier wave (225–400 megacycles) by carrier generator 16, thereby producing the standard input signal indicated graphically at 19. The standard pulse modulated wave 19 is applied through the generator attenuator 18 to the receiver 20 under test.

The receiver output circuit compares the signal-plus-noise to the noise without a signal of the receiver output 23 across the voltage divider 34 by means of the electronic switch 28, rectifier tubes 30, 32 and meter 40 arrangement. The ten cycle per second square-wave 13 generated by the multivibrator 14 actuates the electronic switch 28 from a first position AC to a second position BD simultaneously with the appearance of the signal on the receiver input modulated carrier wave 19 and moves the switch 28 from the second position BD back to the first position AC simultaneous with the end of the signal on the input wave. The output 23 of the receiver under test thereby is alternately connected to the opposite ends of a voltage divider 34 according to whether or not a signal is superimposed upon the carrier input wave. A "signal-plus-noise" rectifier tube 30 and a "noise" rectifier tube 32 are placed, respectively, between the first position of the electronic switch 28 and the more positive end of the voltage divider 34 and between the second position of the switch 28 and the more negative end of the voltage divider 34.

The desired signal-plus-noise to noise ratio is preset by means of contact arm 35 on the voltage divider 34 and the zero center reading meter 40 connected thereto. The carrier generator 16 is tuned to the receiver's 20 center frequency and the generator attenuator 18 adjusted for zero center reading on the meter 40. The generator attenuator 18 setting then gives the receiver sensitivity for the preset signal-plus-noise to noise ratio.

The invention is not limited to the examples of embodiments shown and described, but may on the contrary, be capable of many modifications without departing from the spirit of the invention.

I claim:

1. Apparatus for measuring the sensitivity of a radio receiver, having an input and an output, based on the receiver input signal required to give a predetermined signal-plus-noise to noise ratio, said apparatus comprising: a signal generator for producing a test signal in the form of a carrier wave that is alternately amplitude modulated and unmodulated for equal intervals of time; a calibrated attenuator connected between the output of said signal generator and the input of the said receiver under test; a pair of resistors having resistance values in the same ratio as said predetermined signal-plus-noise to noise ratio; a center-zero meter; and means, connected between the output of said receiver and said meter and containing a switching device synchronized with said signal generator, operative during the intervals when said test signal is modulated to pass a direct current proportional to the output of said receiver through the larger of said resistors and said meter in one direction and operative during the intervals when said test signal is unmodulated to pass a direct current proportional to the output of said receiver through the smaller of said resistors and said meter in the opposite direction.

2. Apparatus for measuring the sensitivity of a radio receiver, having an input and an output, based upon the receiver input signal required to give a predetermined signal-plus-noise to noise ratio comprising: means for producing a pulse modulated carrier wave, a calibrated attenuator coupled to the output of said means for producing, the output of said calibrated attenuator being connected to the input of the said receiver, an electronic switch having first and second positions, means for actuating the said electronic switch simultaneously with the appearance of a pulse upon the said carrier wave alternately from the said first position to the said second position, the said switch being in the said first position when a modulating pulse appears upon said carrier wave and in the said second position when no modulating pulse appears upon said carrier wave, a variable voltage divider with a contact arm, first and second rectifier tubes, means coupling the output of said receiver through said switch with the anode of said first rectifier tube, means coupling the cathode of said first rectifier tube with an end of said voltage divider, means coupling the output of said receiver through said switch with the cathode of said second rectifier tube, means coupling the anode of said second rectifier tube with the other end of said voltage divider, a meter connected to the said contact arm.

3. Apparatus for measuring the sensitivity of a radio receiver based, having an input and an output, upon the receiver input signal required to give a predetermined signal-plus-noise to noise ratio comprising: means for producing a pulse modulated carrier wave, a calibrated attenuator coupled to the output of said means for producing, the output of said calibrated attenuator being connected to the input of the said receiver, an amplifier coupled to the output of said receiver for setting the correct level of sensitivity for the said receiver under test, an electronic switch having first and second positions, means for actuating the said electronic switch simultaneously with the appearance of a pulse upon said carrier wave alternately from the said first position to the said second position, the said switch being in said first position when a modulating pulse appears upon said carrier wave and in the second position when no modulating pulse appears upon said carrier wave, a variable voltage divider with a contact arm, first and second rectifier tubes, means coupling the output of said amplifier through said switch with the anode of said first rectifier tube, means coupling the cathode of said first rectifier tube with an end of said voltage divider, means coupling the output of said amplifier through said switch with the cathode of said second rectifier tube, means coupling the anode of said second rectifier tube with the other end of said voltage divider, a center-zero meter connected to the said contact arm.

4. Apparatus for measuring the sensitivity of a radio receiver based, having an input and an output, upon the receiver input signal required to give a predetermined signal-plus-noise to noise ratio comprising: means for generating a continuous sinusoidal modulating wave, amplifier means coupled to the output of said generating means, means for generating a continuous square wave, means for coupling said square wave generating means to said amplifier means for energizing and deenergizing the said amplifier means, whereby the output of the said amplifier means is a pulsed on and off sinusoidal modulating wave, a carrier generator coupled to the output of said amplifier means for producing a pulse modulated wave, a calibrated attenuator coupled to the output of said carrier generator, the output of said calibrated attenuator being connected to the input of the said receiver, an electronic switch having first and second positions, means for coupling said square wave generating means to said switch for actuating said switch from the said first position to the said second position simultaneously with the deenergization of the said amplifier means and moving the switch from the said second position to the said first position simultaneously with the energization of the said amplifier means, a variable voltage divider with a contact arm, first and second rectifier tubes, means coupling the output of said receiver through said switch with the anode of said first rectifier tube, means coupling the cathode of said first rectifier tube with an end of said voltage divider, means coupling the output of said second position of said switch with the cathode of said second rectifier tube, means coupling the anode of said second rectifier tube with the other end of said voltage divider, a meter connected to the said contact arm.

References Cited in the file of this patent

UNITED STATES PATENTS 2,691,098 Selave ---------------- Oct. 5, 1954